Nov. 21, 1950     H. T. J. WIEGERINCK ET AL     2,530,847

TUNING INDICATOR SYSTEM

Filed Feb. 12, 1947

HENDRIKUS THEODORUS JOZEF WIEGERINCK
JOHAN HENDRIK VAN WAGENINGEN
INVENTORS.

BY

AGENT.

Patented Nov. 21, 1950

2,530,847

UNITED STATES PATENT OFFICE 2,530,847

TUNING INDICATOR SYSTEM

Hendrikus Theodorus Jozef Wiegerinck and Johan Hendrik van Wageningen, Eindhoven, Netherlands, assignors to Hartford National Bank and Trust Company, Hartford, Conn., as trustee Application February 12, 1947, Serial No. 728,060
In the Netherlands July 15, 1944

Section 1, Public Law 690, August 8, 1946
Patent expires July 15, 1964

10 Claims. (Cl. 250—40)

This invention relates to a circuit-arrangement for the indication of the frequency of electric oscillations, and more particularly for indicating the correct tuning of a tunable receiver, such as a radio or television receiver, with the use of a frequency detector.

It has been suggested to secure an indication of the correct tuning of a radio receiver by comparing two voltages obtained from a network wherein one of the voltages is higher or lower respectively than the other voltage, depending upon whether the frequency of the intermediate frequency oscillations supplied to the network is higher or lower than the desired intermediate frequency. At the correct tuning, the two voltages are equal. In this case, the two voltages to be compared are each taken from a resonant circuit, the resonant circuits being coupled to the intermediate frequency amplifier and being tuned respectively to frequencies that are higher or lower than the desired intermediate frequency and which differ from the intermediate frequency by the same amount.

According to the present invention, the frequency detector supplies a voltage which varies in a positive or a negative sense depending upon whether the frequency of the oscillations diverges in one or in the other direction from the frequency to which the circuit is tuned. This voltage or a voltage obtained therefrom is supplied to at least two input electrodes of a discharge system which, in addition, comprises a cathode and two or more further electrodes and, also by suitable adjustment of the discharge system, influences the current distribution between the electrodes in such manner that a voltage suitable for the indication is obtainable from at least one of these electrodes. This voltage exhibits an extreme value when the frequency of the electric oscillations corresponds with the frequency to which the circuit is tuned.

The discharge system is preferably constituted by a discharge tube having three or more grids, for example, a pentode. The indication voltage is supplied to a suitable indicator system, for example a cathode-ray indicator system.

In order that the invention may be clearly understood and readily carried into effect, it will now be set out more fully with reference to the accompanying drawing, in which Figs. 1 through 5 illustrate embodiments of the invention.

Figure 1:
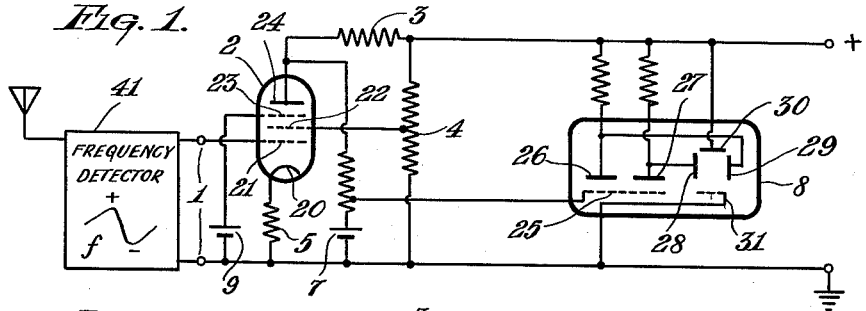

Fig. 1 shows a circuit-arrangement for indicating the correct tuning of a wireless receiver designed for the reception of frequency-modulated signals. The receiver comprises a frequency detector 41, from which is derived a voltage which varies in a positive or a negative sense depending upon whether the frequency to which the receiver is tuned differs in one or in the other direction from the carrier wave frequency of the incoming signal. This voltage is supplied to terminals designated 1 and then conducted to the control-grid 21 of a pentode 2. The anode 24 of this pentode is connected via a resistance 3 and the screen grid 22 via a potentiometer 4 to the positive terminal of a direct current source (not shown). In addition, the pentode 2 is provided with negative feedback by means of a resistance 5 included in the cathode lead. The suppressor grid 23 is connected to that end of the resistance 5 which is remote from the cathode 20, so that the voltage across the resistance 5 (this voltage being consequently obtained from the voltage coming from the frequency detector 41) is also imparted to the suppressor grid 23. The indication voltage is obtained from the anode of the tube 2. For this purpose the anode 24 is connected to earth via a potentiometer 6 and a source of direct voltage 7. The indication voltage is taken from the potentiometer 6 and supplied to a cathode-ray indicator system. This indicator system comprises two triodes and the cathode-ray indicator proper which are jointly housed in a single tube 8. This system is otherwise well-known and so it need not be explained more fully.

The voltage of the source of direct voltage 7 is chosen to be of such magnitude that the indicator shows a maximum width of the light spot if the voltage between the terminals 1 is equal to zero, that is to say when the receiver is tuned correctly. The voltage applied to the control grid 25 of the indicator tube 8, which voltage determines the width of the light spot, is dependent on the voltage drop across potentiometer 6, and hence will vary in magnitude, following anode voltage variations of tube 2.

The operation of the circuit-arrangement is as follows: If the upper one of the two terminals 1 (that is to say the terminal connected to the control-grid 21 of the pentode 2) becomes negative with respect to the other terminal, the anode current of the tube 2 drops and the anode voltage rises. The control-grids 25 of the triodes associated with the indicator system become less negative and the size of the light spot (and if there is a plurality of the light spots) decreases.

Now, if the said terminal becomes positive relatively to the other terminal, it can be ensured by suitable adjustment of the tube 2 that the anode current decreases again, with the result that the anode voltage increases and the light spot of the cathode-ray indicator decreases in size. This operation is based on a distribution of the current between the anode 24 and the screen-grid 22. In the first case referred to the anode current drops jointly with the screen-grid current and in the second case the anode current decreases while the screen-grid current increases.

The decrease of the anode current in the second case can be explained as follows. Owing to the constantly decreasing anode voltage at an increasing anode current there will be a moment when the anode voltage becomes lower than the screen-grid voltage; approximately from this point the anode current no longer increases, so that as the cathode current increases the screen-grid current alone increases. Now the suppressor grid becomes more and more negative, because the voltage across the resistance 5 is constantly increasing. Owing to this the anode current decreases further, whereas the screen-grid current increases to a greater extent. The effect of the suppressor grid may, if necessary, be influenced by giving this grid a negative bias; this bias may be supplied, for example, by a battery 9.

It follows from the above that at a given voltage between the terminals 1 the anode current of the tube and the width of the light spot of the indicator have extreme values. Thus, the circuit is adjusted in such manner that this extreme value occurs when the receiver is tuned to the frequency of the incoming oscillations. As a rule, the voltage received from the frequency detector has the value zero, so that the circuit must be adjusted in such manner that the extreme value of the anode current occurs when the voltage supplied to the terminals 1 has the value zero. In this case the circuit-arrangement acts as a zero-voltage indicator. The correct adjustment of the circuit is ensured by regulating the electrode voltages and by suitable proportioning of the resistances 3, 4, 5 and 6. When the voltage applied to the terminals 1 has the value zero, the anode and screen grid voltages have substantially equal values.

In a circuit-arrangement as constructed in practice, in which a pentode of the type 6K7 was used, the resistances 3 and 5 had the following values: $R_3 = 1M\omega$ and $R_5 = 4700\omega$ at a negative bias of the suppressor grid of from 0 to 1.5 v. At a negative bias of 12 volts, $R_5$ was $8000\omega$. The main voltage supply conforms to standard practice and may have, for instance, a value of 250 volts. Similarly, potentiometer 4 may have a resistance value of $1M\omega$, and the tap thereof may be so adjusted that when the voltage applied to terminals 1 has the value zero, the screen grid potential is approximately 150 volts. The resistances included in the anode circuits of the triode portions of tube 8 may each have a value of $1M\omega$.

Figure 2:
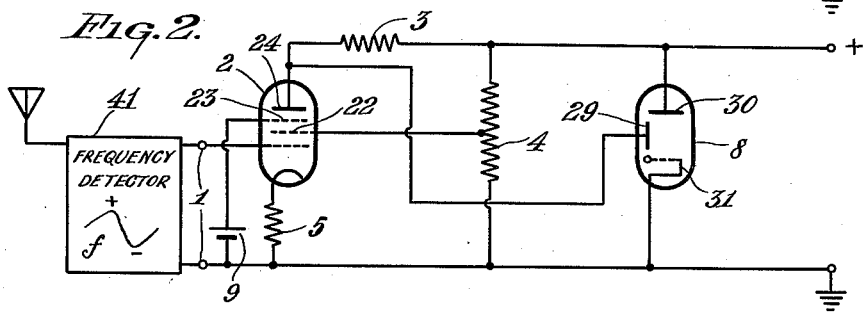

Fig. 2 shows a circuit-arrangement which primarily corresponds with that shown in Fig. 1, the anode voltage of the tube 2 serving, however, in a direct manner as the indicator voltage. In this case the indicator comprises a single cathode-ray indicator system without additional triodes. The suppressor grid 23 is given a fixed negative bias by means of a direct voltage source 9. The operation of this circuit entirely corresponds with that of the circuit referred to before and shown in Fig. 1. The variation of the width of the light spot of the indicator, however, ensues in the opposite sense, due to the omission of the triodes. The width of the light spot is determined by the voltage applied to deflection electrode 29, which voltage is directly dependent on the anode voltage of tube 2.

Figure 3:
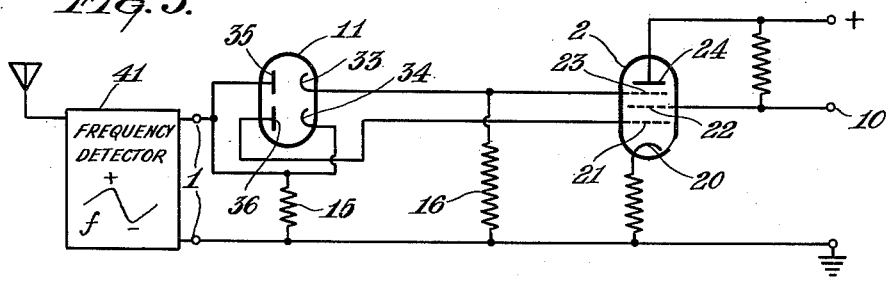
Figure 4:
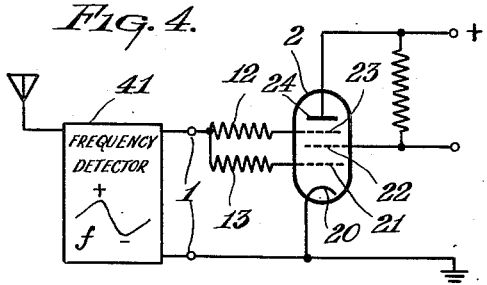
Figure 5:
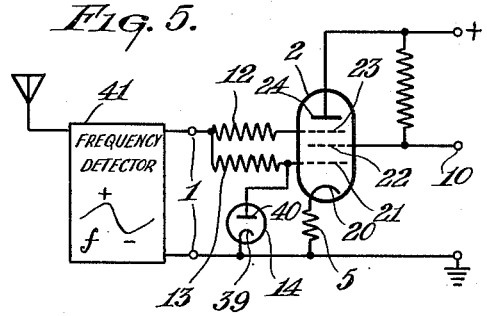

Figs. 3, 4 and 5 show circuit-arrangements in which the voltage received from the frequency detector is supplied directly to two grids of the pentode 2, viz. to the control-grid 21 and to the suppressor grid 23. The indication voltage is obtained from the screen grid 22 and can be taken from the terminal designated 10.

In the circuit shown in Fig. 3, the voltage of the frequency detector is conducted through a duo-diode 11 to the two grids 21 and 23. The cathode 23 of one of the diodes is connected to the suppressor grid 23, the anode 36 of the other diode to the control-grid 21. A leak 15 and 16 respectively is connected in parallel to each of the diodes. In the negative phase of the voltage taken from the frequency detector the cathode current, and hence the screen grid current, decreases with respect to the current set up when the said voltage has the value zero. In the positive phase of the said voltage only the voltage of the suppressor grid assumes a higher positive value, so that the anode current increases and the screen grid current again decreases (the sum of the two currents being constant). The anode and screen grid voltages are adjusted in relation to each other so that when the voltages applied to the control grid 21 and the suppressor grid 23 have the value zero, the screen grid current is a maximum. If the voltage received from the frequency detector has the value zero, which occurs when the receiver is correctly tuned, the screen grid current has a maximum value and the voltage of the screen grid, i. e. the indication voltage, a minimum value.

In the circuit arrangement shown in Fig. 4 the duodiode 11 is replaced by two resistances 12 and 13. The operation of the circuit is, however, unvaried. For the negative phase of the voltage taken from the frequency detector it is obvious that the screen-grid current decreases; in the positive phase the voltage of the control-grid shows substantially no increase due to the diode effect of the control-grid 21 in conjunction with the high series resistance 13, so that even now the screen-grid current decreases. In this case the suppressor grid 23 does not exhibit any appreciable diode effect. Such an effect may, for example, be avoided by causing this grid to emit secondarily to a slight extent. Consequently, the screen-grid voltage, which is used as the indication voltage, exhibits a minimum value in the case of correct tuning.

The same remarks as those made in connection with the circuit-arrangement shown in Fig. 4 apply to that shown in Fig. 5, with the understanding that the suppressor grid 23 and the control-grid 21 can no longer exhibit a diode effect in the positive phase by reason of the negative voltage set up across the resistance 5. In this case, the diode effect of the control-grid 21 in the positive phase is taken over by a supplementary diode 14 which is connected between the control-grid 21 and the lower one of the two terminals 1.

In the circuit-arrangements shown in Figs. 3 and 5, use is preferably made of a pentode in which the mutual conductances of the suppressor grid 23 and the control-grid 21 are of about the same order of magnitude. In the circuit-arrangement shown in Fig. 4 there is preferably employed a similar pentode which, in addition, exhibits a very low grid current at positive grid voltages.

As a rule, the frequency detector provides a voltage which has the value zero when the receiver is tuned in the correct manner to the incoming signal. If, however, no signal is received, the voltage received from the frequency-detector also exhibits the value zero. Consequently, both in the case of correct tuning and in the absence of signals the indicating system shows the same result. In order to obviate this disadvantage, the indicator system may have supplied to it efficiently an additional supplementary voltage whose value depends on the signal strength. This voltage may be taken, for example, from the device for automatic gain control of the receiver. The deflecting plates 28 and 29 of the cathode-ray indicator system 8 (Fig. 1) may be connected, for example, to the anodes of two discharge tubes (for example pentodes) which are controlled by the regulating voltage for the automatic gain control of the receiver.

If the regulating voltage for the automatic gain control has the value zero which occurs in the absence of a signal, the said tubes have passing through them an important anode current due to which the voltage at the deflecting plates decreases. If, on the contrary, a signal is received, the regulating voltage for the automatic gain control decreases the anode current of the two tubes, so that the deflecting plates are influenced by the indication voltage only. Due to this, in the absence of signals, the indicator system registers a result different from that in the case of correct tuning to a signal.

An identical result may be achieved in the circuit shown in Fig. 1 by replacing the source of direct current 7 by a voltage derived from the automatic gain control.

What we claim is:

1. A tuning indicator circuit arrangement for indicating variations in frequency about a given frequency value, comprising frequency responsive means for producing a first direct voltage having amplitude and sign variations about a given amplitude value proportional to variations of said frequency about the said given frequency value, a discharge tube having in the order named a cathode, a screen grid and an anode, and means to vary the distribution of current between said screen grid and said anode, said means comprising a first control grid interposed between said cathode and said screen grid, a second control grid interposed between said screen grid and said anode, means to apply said first direct voltage at values thereof below said given value to one of said control grids, and means to apply a direct voltage proportional to said first direct voltage at values thereof above said given value to the other of said control grids.

2. A tuning indicator circuit arrangement for indicating variations in frequency about a given frequency value, comprising frequency responsive means for producing a first direct voltage having amplitude and sign variations about a given amplitude value proportional to variations of said frequency about the said given frequency value, a discharge tube having in the order named a cathode, a screen grid and an anode, means to vary the distribution of current between said screen grid and said anode, comprising a control grid interposed between said cathode and said screen grid, a suppressor grid interposed between said screen grid and said anode, means to apply said first direct voltage to said control grid and a first impedance element coupled between said cathode and said suppressor grid to apply to said suppressor grid a second direct voltage proportional to said first direct voltage, a second impedance element coupled between said anode and said cathode, an output indicator, means to derive a control voltage from said second impedance element, and means to apply said control voltage to said output indicator.

3. A tuning indicator circuit arrangement for indicating variations in frequency about a given frequency value, comprising frequency responsive means for producing a first direct voltage having amplitude and sign variations about a given amplitude value proportional to variations of said frequency about the said given frequency value, a discharge tube having in the order named a cathode, a screen grid and an anode, means to vary the distribution of current between said screen grid and said anode comprising a control grid interposed between said cathode and said screen grid, a suppressor grid interposed between said screen grid and said anode, means to apply said first direct voltage to said control grid, a first impedance element coupled between said cathode and said suppressor grid to apply to said suppressor grid a second direct voltage proportional to said first direct voltage and means to apply substantially equal direct potentials to said anode and said screen grid at input levels of said first direct voltage substantially equal to said given amplitude value, a second impedance element coupled between said anode and said cathode, an output tuning indicator, means to derive a control voltage from said second impedance element, and means to apply said control voltage to said output tuning indicator.

4. A tuning indicator circuit arrangement for indicating variations in frequency about a given frequency value, comprising frequency responsive means for producing a first direct voltage having amplitude and sign variations about a given amplitude value proportional to variations of said frequency about the said given frequency value, a discharge tube having in the order named a cathode, a screen grid and an anode, means to vary the distribution of current between said screen grid and said anode comprising a control grid interposed between said cathode and said screen grid, a suppressor grid interposed between said screen grid and said anode, means to apply said first direct voltage to said control grid, a first impedance element coupled between said cathode and said suppressor grid to apply to said suppressor grid a second direct voltage proportional to said first direct voltage and means to apply substantially equal direct potentials to said anode and said screen grid at input levels of said first direct voltage substantially equal to said given amplitude value, a second impedance element coupled between said anode and said cathode, an output indicating device comprising two parallel discharge paths each having a cathode, a control grid and an anode, a cathode ray indicating system having a pair of deflecting plates and means to couple each of the anodes of said discharge paths to a respective deflecting plate, means to derive a control voltage from said second impedance element, and means to apply said control voltage to the grids of said discharge paths.

5. A tuning indicator circuit arrangement for indicating variations in frequency about a given frequency value, comprising frequency responsive means for producing a first direct voltage having amplitude and sign variations about a given amplitude value proportional to variations of said frequency about the said given frequency value, a discharge tube having in the order named a cathode, a screen grid and an anode, means to vary the distribution of current between said screen grid and said anode, comprising a control grid interposed between said cathode and said screen grid, a suppressor grid interposed between said screen grid and said anode, means to apply said first direct voltage to said control grid and an impedance element coupled between said cathode and said suppressor grid to apply to said suppressor grid a second direct voltage proportional to said first direct voltage, an output indicator having a control electrode, and means to couple said anode to said control electrode.

6. A tuning indicator circuit arrangement for indicating variations in frequency about a given frequency value, comprising frequency responsive means for producing a first direct voltage having amplitude and sign variations about a given amplitude value proportional to variations of said frequency about the said given frequency value, a discharge tube having in the order named a cathode, a screen grid and an anode, means to vary the distribution of current between said screen grid and said anode comprising a control grid interposed between said cathode and said screen grid, a suppressor grid interposed between said screen grid and said anode, means to apply said first direct voltage to said control grid, a first impedance element coupled between said cathode and said suppressor grid to apply to said suppressor grid a second direct voltage proportional to said first direct voltage and means to apply substantially equal direct potentials to said anode and said screen grid at input levels of said first direct voltage substantially equal to said given amplitude value, an output tuning indicator having a control electrode, and means to couple said anode to said control electrode.

7. A tuning indicator circuit arrangement for indicating variations in frequency about a given frequency value, comprising frequency responsive means for producing a first direct voltage having amplitude and sign variations about a given amplitude value proportional to variations of said frequency about the said given frequency value, a discharge tube having in the order named a cathode, a screen grid and an anode, means to vary the distribution of current between said screen grid and said anode, said means comprising a first control grid interposed between said cathode and said screen grid, a second control grid interposed between said screen grid and said anode, means to apply said first direct voltage at values thereof below said given value to said first control grid and means to apply said first direct voltage at values thereof above said given value to said second control grid, an impedance element coupled between said anode and said screen grid, and means to derive a control voltage across said impedance element.

8. A tuning indicator circuit arrangement for indicating variations in frequency about a given frequency value, comprising frequency responsive means for producing a direct voltage having amplitude and sign variations about a given amplitude value proportional to variations of said frequency about the said given frequency value, a discharge tube having in the order named a cathode, a screen grid and an anode, means to vary the distribution of current between said screen grid and said anode, said means comprising a first control grid imposed between said cathode and said screen grid, a second control grid interposed between said screen grid and said anode, first and second unidirectional conductors each having a cathode and an anode, means to couple the cathode of said first conductor to the anode of said second conductor to define a junction, means to couple the anode of said first conductor to said first control grid, means to couple the cathode of said second conductor to said second control grid and means to apply said first voltage to said junction to apply to said first control grid a second direct voltage at values of said first voltage below said given value, said second voltage being proportional to said first voltage, and to apply to said second control grid a third direct voltage at values of said first voltage above said given value, said third voltage being proportional to said first voltage, an impedance element coupled between the screen grid and anode of said tube, and means to derive a control voltage across said impedance element.

9. A tuning indicator circuit arrangement for indicating variations in frequency about a given frequency value, comprising frequency responsive means for producing a direct voltage having amplitude and sign variations about a given amplitude value proportional to variations of said frequency about the said given frequency value, a discharge tube having in the order named a cathode, a screen grid and an anode, means to vary the distribution of current between said screen grid and said anode, said means comprising a first control grid interposed between said cathode and said screen grid, a second control grid interposed between said screen grid and said anode, first and second resistors each having two terminals, means to couple together one terminal of each of said resistors to form a junction, means to couple the other terminals of said resistors respectively to said first and second control grids and means to apply said first direct voltage to said junction to apply to said first control grid a second direct voltage at values of said first voltage below said given value and to apply to said second control grid a third direct voltage at values of said first voltage above said given value, an impedance element coupled between said anode and said screen grid, and means to derive a control voltage across said impedance element.

10. A tuning indicator circuit arrangement for indicating variations in frequency about a given frequency value, comprising frequency responsive means for producing a direct voltage having amplitude and sign variations about a given amplitude value proportional to variations of said frequency about the said given frequency value, a discharge tube having in the order named a cathode, a screen grid and an anode, means to vary the distribution of current between said screen grid and said anode, said means comprising a first control grid interposed between said cathode and said screen grid, a second control grid interposed between said screen grid and said anode, first and second resistors each having two terminals, means to couple together one terminal of each of said resistors to form a junction, means to couple the other ends of said resistors respectively to said first and second control grids, a unidirectional conductor having an anode and a cathode, means to couple the anode of said conductor to said first control grid, means to couple the cathode of said conductor to ground potential, a first impedance element coupled between the cathode of said tube and ground potential and means to apply said first direct voltage to said junction to apply to said first control grid a second direct voltage at values of said first voltage below said given value and to apply to said second control grid a third voltage at values of said first voltage above said given value, a second impedance element coupled between said anode and said screen grid, and means to derive a control voltage across said second impedance element.

HENDRIKUS THEODORUS
JOZEF WIEGERINCK.
JOHAN HENDRIK van WAGENINGEN.

REFERENCES CITED

The following references are of record in the file of this patent:

UNITED STATES PATENTS

| Number | Name | Date |
|---|---|---|
| 2,194,516 | Anderson | Mar. 26, 1940 |
| 2,214,574 | Bruck | Sept. 10, 1940 |
| 2,241,145 | Levy | May 6, 1941 |
| 2,259,873 | Baumgartner | Oct. 21, 1941 |
| 2,286,413 | Herold et al | June 16, 1942 |
| 2,341,936 | Maynard | Feb. 15, 1944 |
| 2,379,765 | Trevor | July 3, 1945 |